United States Patent Office 3,428,651
Patented Feb. 18, 1969

3,428,651
ESTERS OF CHRYSANTHEMUM-MONOCARBOX-YLIC ACID AND CHRYSANTHEMUM-DICAR-BOXYLIC ACID MONOMETHYL ESTER WITH N-HYDROXY METHYL MALEIMIDES
Takeaki Kato and Kenzo Ueda, Nishinomiya-shi, Sadao Horie, Suita-shi, Toshio Mizutani, Amagasaki-shi, Keimei Fujimoto, Minoo-shi, and Yositosi Okuno, Nishinomiya-shi, Japan, assignors to Sumitomo Chemical Company, Ltd., Osaka, Japan, a corporation of Japan
No Drawing. Original application Dec. 1, 1964, Ser. No. 415,209, now Patent No. 3,318,766, dated May 9, 1967. Divided and this application Feb. 11, 1966, Ser. No. 538,885
Claims priority, application Japan, Dec. 3, 1963, 38/65,181; Dec. 19, 1963, 38/68,673; Mar. 18, 1964, 39/14,946
U.S. Cl. 260—326.3    9 Claims
Int. Cl. C07d 27/00; A01n 9/22

ABSTRACT OF THE DISCLOSURE

Esters of either chrysanthemum monocarboxylic acid or pyrethric acid as the acid moiety and an N-hydroxymethyl maleimide compound as the alcohol moiety were prepared. The esters possess significant insecticidal power but are harmless to warm-blooded animals.

CROSS REFERENCE TO RELATED APPLICATION

This application is a division of our copending application Ser. No. 415,209, filed Dec. 1, 1964, now Patent No. 3,318,766, issued May 9, 1967.

This invention relates to novel cyclopropanecarboxylic acid esters. More particularly, it relates to novel cyclopropanecarboxylic acid esters having the general formula,

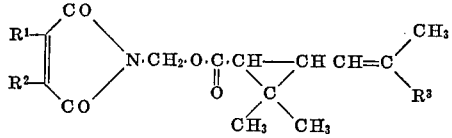

wherein $R^1$ is a member selected from the group consisting of hydrogen atom, methyl, ethyl, propyl and isopropyl radicals, and the radicals having the general formula,

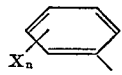

wherein X is a member selected from the group consisting of methyl and methoxy radicals, and $n$ is an integer of 0 to 2, $R^2$ is a member selected from the group consisting of hydrogen atom, and methyl, ethyl, propyl and isopropyl radicals; and $R^3$ is a member selected from the group consisting of methyl and methoxycarbonyl radicals.

It is one object of the present invention to provide a novel group of cyclopropanecarboxylic acid esters, particularly of chrysanthemum carboxylic acid esters, which have strong insecticidal activities to house and agricultural insects with low toxicities to warm-blooded animals and plants, and which can be commercially produced in low cost. Other objects will be obvious from the following description.

As an insecticide utilizable with safety because of the harmlessness to warm-blooded animals, pyrethrum extract has long been employed. Recently, allethrin which is an analog of the effective ingredients in pyrethrum extract, i.e. pyrethrin and cinerin, was synthesized and developed for insecticidal uses. These ingredients are surely valuable in their high insecticidal powers, especially in their rapid effect to insects, and in the characteristics of permitting no, or little, resistivity to insects. However, their uses are limited to some extent because of their complicated steps of the production and their great expenses for the production.

The present inventors have made broad researches on the various cyclopropanecarboxylic acid esters, and have now found the present novel group of cyclopropanecarboxylic acid esters, which possess significant insecticidal power but are harmless to warm-blooded animals, and which can be prepared from easily available materials by a simple process with low prices. In other words, the present compounds are maleimidomethyl esters of chrysanthemum carboxylic acids. Accordingly, it is a feature of the present invention that the characteristics of the present compounds resemble pyrethrin, cinerin and allethrin, even though the alcohol moieties of the former are extremely simple as compared to those of the latter and are composed of carbon, hydrogen, oxygen, and nitrogen atoms, unlike the latter composed of carbon, hydrogen and oxygen.

Thus, the present invention is to provide novel cyclopropanecarboxylic acid esters having the formula,

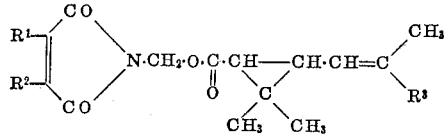

wherein $R^1$, $R^2$ and $R^3$ have the same meanings as identified above, and to provide a process for preparing such compounds, comprising esterifying a maleimide compound having the general formula,

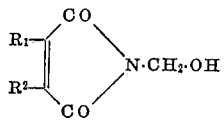

wherein $R^1$ and $R^2$ have the same meanings as identified above, with a cyclopropanecarboxylic acid having the general formula,

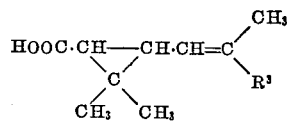

wherein $R_3$ has the same meaning as identified above, according to the general esterifying procedure.

The maleimide compounds employed in the present invention, in other words, N-(hydroxymethyl)-maleimides may be prepared from maleic anhydride, its imide compound, or their substituted compounds, according to the conventional procedures well-known to those skilled in the art. For instance, N-(hydroxymethyl)-dimethylmaleimide may be prepared by reaction of dimethylmaleimide with formaldehyde of its low molecular weight polymer according to the conventional methylolation conditions in the presence or absence of an alkaline catalyst, such as sodium hydroxide and potassium carbonate, in a solvent, such as water, benzene, and toluene. Similarly, various N-hydroxymethyl)-maleimides, such as N-(hydroxymethyl)-monomethylmaleimide, N-(hydroxymethyl)-methyl ethylmaleimide, N-(hydroxymethyl)-diethylmaleimide, N-hydroxymethyl)-methyl n-propylmaleimide, N-(hydroxymethyl)-methyl isopropylmaleimide, N-(hydroxymethyl)-phenylmaleimide, N-(hydroxymethyl)-1-methyl-2-phenylmaleimide, N-(hydroxymethyl)-1-ethyl-2-phenylmaleimide, N-(hydroxymethyl)-1-isopropyl-2-phenylmaleimide, N-(hydroxymethyl)-1-methyl-2-(2′,4′-dimethylphenyl) - maleimide, N-(hydroxymethyl)-1-ethyl-2- (p-tolyl)maleimide, N-(hydroxymethyl)-1-methyl-2-(p-anisyl)-maleimide, and the like compounds, may be prepared.

The cyclopropanecarboxylic acid employed in the present invention is either chrysanthemic acid (chrysanthemum monocarboxylic acid, $R^3$ being $CH_3$) or pyrethric acid ($R^3$ being $COOCH_3$, a monomethyl ester of chrysanthemum dicarboxylic acid). They are the acidic moieties of pyrethrin, cinerin and allethrin, and can be synthesized according to the known method.

The esterification reaction of the present invention may be effected in various ways. The N-(hydroxymethyl)-maleimide compound may be heated with the cyclopropanecarboxylic acid in the presence of a strong acid, such as aromatic sulfonic acid and sulfuric acid, in an organic solvent capable of azeotropically boiling with water, thereby to remove the water formed in esterification, out of the reaction system. It may also be heated with a lower alkyl ester of the cyclopropanecarboxylic acid in the presence of a basic catalyst, such as sodium, potassium, sodium alcoholate and potassium alcoholate, thereby to continuously remove the lower alcohol formed through tre transesterification out of the reaction system. In such case, methyl, ethyl, n-propyl and isopropyl ester are suitable. In the most preferable esterification, it may be treated with the cyclopropanecarboxylic acid halide in an inert organic solvent, preferably in the presence of a de-hydrogen halide agent, such as pyridine, triethylamine and other tertiary amine whereby the esterification is proceeded with the isolation of a hydrohalic acid salt within a short period of time. In this case, the acid chloride is the most preferable, though the bromide and the iodide may be employable. Further, it may be refluxed with the cyclopropanecarboxylic acid anhydride in an inert solvent for several hours, thereby to yield the objective ester and free cyclopropanecarboxylic acid, the latter being recovered and again converted to the anhydride by treatment with, for example acetic anhydride for reuse. Alternatively, the N-(hydroxymethyl)-maleimide compound may be employed for the esterification by once converting to the form of the halide having the general formula,

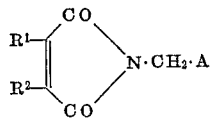

wherein $R^1$ and $R^2$ have the same meanings as identified above, and A means a halogen atom, by treatment with thionyl chloride or phosphorus trichloride etc. In this case, the halide may be heated with an alkali metal or ammonium salt of the cyclopropanecarboxylic acid in an inert solvent, thereby to yield the objective ester with the isolation of an alkali metal or ammonium halide salt. Alternatively, the halide may be heated with the free acid in an inert solvent in the presence of a dehydrogen halide agent, such as tertiary amines. In the formula, A may be any of chlorine, bromine, and iodine, among which the former two are preferable and practical. As the alkali metals, sodium and potassium are preferable and practical. As the alkali metals, sodium and potassium are preferable.

As well-known, the cyclopropanecarboxylic acid as identified above comprises various stereoisomers and optical isomers. It is needless to say that the acid and the derivatives thereof as described herein involve their isomers.

The process of the invention is described in more detail with reference to the following examples, which are however to be construed for the purpose of illustration and not of the limitation.

Example 1

A mixture of 14.1 g. of N-(hydroxymethyl)-monomethyl-maleimide, 32 g. of chrysanthemic acid (trans type) anhydride and 60 g. of dry toluene was refluxed for 3 hours, and the reaction mass was washed with an aqueous 3% sodium hydroxide solution at a temperature below 10° C., thereby to remove the by-produced chrysanthemic acid. The reaction mass was then washed with a saturated sodium chloride solution, dried over sodium sulfate, and passed through an alumina column for purification, and then evaporated in vacuo. The colorless viscous liquid product, N-(chrysanthemoxymethyl)-methyl - maleimide, weighed 24.8 g., $n_D^{31}$ 1.5051.

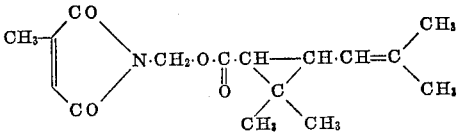

*Analysis.*—Found: C, 66.02; H, 7.26; N, 5.00%. Calculated (as $C_{16}H_{21}NO_4$): C, 65.95; H, 7.27; N, 4.81%.

Example 2

Fifteen point five grams of N - (hydroxymethyl)-dimethylmaleimide was dissolved in a mixture of 50 ml. of dry toluene and 12 g. of dry pyridine.

A solution of 19.2 g. of trans-chrysanthemoyl chloride in 50 ml. of dry toluene was dropped to the solution and the reaction vessel was tightly closed and allowed to stand overnight. Precipitated pyridine hydrochloride was dissolved by adding 30 ml. of water to the reaction mixture and the resulting two layers were separated from each other. The organic layer was washed with a 5% hydrochloric acid, a saturated sodium bicarbonate solution and then with a saturated sodium chloride solution, and dried over sodium sulfate, thereafter purified by passing through an alumina column.

Evaporation of the solvent in vacuo and recrystallization of the residue from a mixture of n-hexane and benzene yielded 22.5 g. of N-(chrysanthemoxymethyl)-dimethylmaleimide, M.P. 74°–78.5° C.

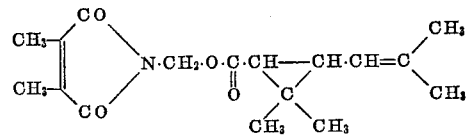

*Analysis.*—Found: C, 66.88; H, 7.56; N, 4.66%. Calculated (as $C_{17}H_{23}NO_4$): C, 66.86; H, 7.59; N, 4.59%.

Example 3

Eighteen point eight grams of N-(chloromethyl)-methyl ethylmaleimide, 16.8 g. of cis- and trans-chrysanthemic acid and 12 g. of triethylamine were dissolved in 200 ml. of dry acetone, and refluxed for 5 hours, while being stirred. After the reaction, the precipitated triethylamine hydrochloride was separated from the reaction mixture by filtration and washed with acetone.

Filtrate was added with washings and evaporated in vacuo to remove the solvent, and the residue was dissolved in toluene. The solution was washed with water and dried over sodium sulfate and passed through an alumina column for purification, and then evaporated in vacuo to leave colorless viscous liquid product, N-(chrysanthemoxymethyl)-methyl ethylmaleimide, in 28.1 g. yield.

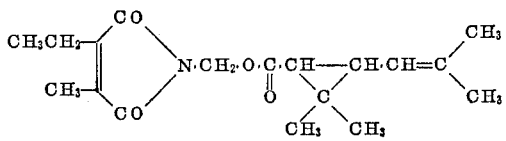

*Analysis.*—Found: C, 67.64; H, 7.89; N, 4.44%. Calculated (as $C_{18}H_{25}NO_4$): C, 67.69; H, 7.89; N, 4.39%.

Example 4

In similar way as described in Example 3, 20.2 g. of N-(chloromethyl)-diethylmaleimide, was allowed to react with 16.8 g. of trans-chrysanthemic acid in the presence of 12 g. of triethylamine in acetone to yield 27.7 g. of N-(chrysanthemoxymethyl)-diethylmaleimide, colorless viscous liquid.

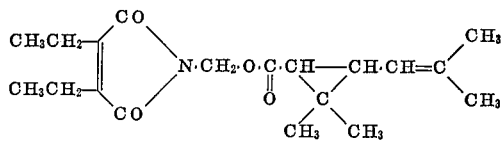

*Analysis.*—Found: C, 68.59; H, 8.15; N, 4.18%. Calculated (as $C_{19}H_{27}NO_4$): C, 68.44; H, 8.16; N, 4.20%.

Example 5

In similar way as described in Example 2, 18.3 g. of N-(hydroxymethyl)-methyl n-propylmaleimide was allowed to react with 19.2 g. of trans-chrysanthemoyl chloride to yield 29.1 g. of N-(chrysanthemoxymethyl)-methyl n-propylmaleimide, colorless viscous liquid, $n_D^{21}$ 1.5025.

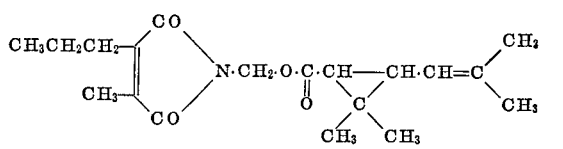

*Analysis.*—Found: C, 68.31; H, 8.20; N, 4.25%. Calculated (as $C_{19}H_{27}NO_4$): C, 68.44; H, 8.16; N, 4.20%.

Example 6

In similar way as described in Example 2, 18.3 g. of N-(hydroxymethyl)-methyl isopropylmaleimide was allowed to react with 19.2 g. of cis-trans-chrysanthemoyl chloride to yield 28.3 g. of N-(chrysanthemoxymethyl)-methyl isopropylmaleimide, colorless viscous liquid.

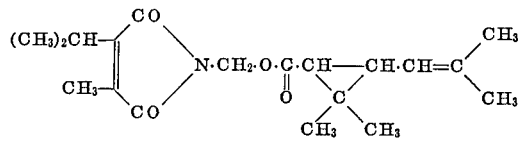

*Analysis.*—Found: C, 68.49; H, 8.11; N, 4.22%. Calculated (as $C_{19}H_{27}NO_4$): C, 68.44; H, 8.16; N, 4.20%.

Example 7

In similar way as described in Example 2, 0.1 mole of N-(hydroxymethyl)-dimethylmaleimide was allowed to react with 0.102 mole of pyrethroyl chloride to yield N - (pyrethroxymethyl) - dimethylmaleimide in 86.0% yield.

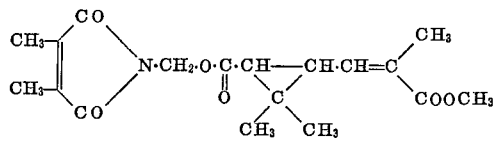

*Analysis.*—Found: C, 61.81; H, 6.83; N, 4.16%. Calculated (as $C_{18}H_{23}NO_6$): C, 61.88; H, 6.64; N, 4.01%.

Example 8

In similar way as described in Example 1, 0.1 mole of N-(hydroxymethyl)-methyl ethylmaleimide was allowed to react with 0.1 mole of pyrethric acid anhydride to yield N-(pyrethroxymethyl)-methyl ethylmaleimide in 82.0% yield.

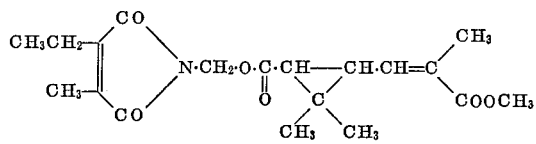

*Analysis.*—Found: C, 63.02; H, 7.13; N, 3.79%. Calculated (as $C_{19}H_{25}NO_6$): C, 62.79; H, 6.93; N, 3.85%.

Example 9

In similar way as described in Example 3, 0.1 mole of N-(chloromethyl)-methyl n-propylmaleimide was allowed to react with 0.1 mole of pyrethric acid to yield N-(pyrethroxymethyl)-methyl n-propylmaleimide in 87.0% yield.

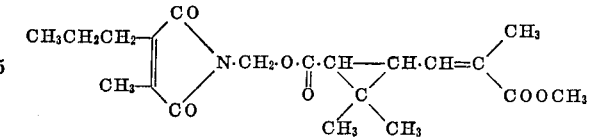

*Analysis.*—Found: C, 63.77; H, 7.31; N, 3.60%. Calculated (as $C_{20}H_{27}NO_6$): C, 63.64; H, 7.21; N, 3.71%.

Example 10

In similar way as described in Example 2, 0.1 mole of N-(hydroxymethyl)-diethylmaleimide was allowed to react with 0.102 mole of pyrethroyl chloride to yield N-(pyrethroxymethyl)-diethylmaleimide in 90.3% yield.

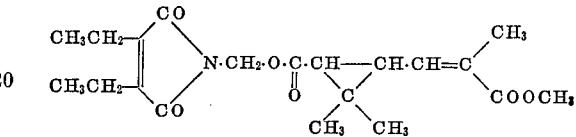

*Analysis.*—Found: C, 63.58; H, 7.33; N, 3.84%. Calculated (as $C_{20}H_{27}NO_6$): C, 63.64; H, 7.21; N, 3.71%.

Example 11

In similar way as described in Example 2, 0.1 mole of N-(hydroxymethyl)-phenylmaleimide was allowed to react with 0.102 mole of pyrethroyl chloride to yield N-(pyrethroxymethyl)-phenylmaleimide, $n_D^{22}$ 1.5660, in 85% yield.

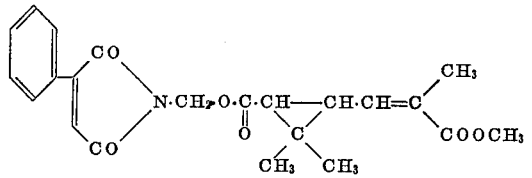

*Analysis.*—Found: C, 66.18; H, 5.94; N, 3.55%. Calculated (as $C_{22}H_{23}NO_6$): C, 66.49; H, 5.83; N, 3.52%.

Example 12

In similar way as described in Example 3, 0.1 mole of N-(chloromethyl)-1-methyl - 2 - phenylmaleimide was allowed to react with 0.1 mole of crysanthemic acid to yield N-(chrysanthemoxymethyl)-1-methyl - 2 - phenylmaleimide, $n_D^{21.5}$ 1.5572, in 84% yield.

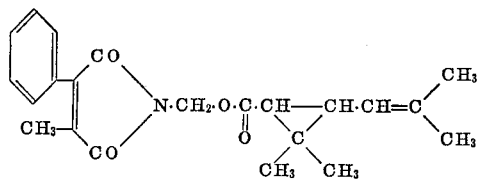

*Analysis.*—Found: C, 72.04; H, 7.00; N, 3.79%. Calculated (as $C_{22}H_{25}NO_4$): C, 71.91; H, 6.86; N, 3.81%.

Example 13

In similar way as described in Example 2, 0.1 mole of N-hydroxymethyl)-1 - ethyl - 2 - phenylmaleimide was allowed to 0.102 mole of chrysanthemoyl chloride to yield N-(chrysanthemoxymethyl)-1-ethyl-2 - phenylmaleimide, M.P. 98°–100° C., in 90% yield.

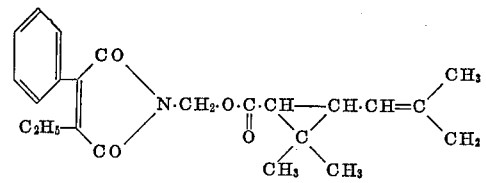

*Analysis.*—Found: C, 72.33; H, 7.21; N, 3.70%. Calculated (as $C_{23}H_{27}NO_4$): C, 72.42; H, 7.13; N, 3.67%.

Example 14

In similar way as described in Example 1, 0.1 mole of N-(hydroxymethyl)-1-methyl-2-(2',4' - dimethylphenyl)-maleimide was allowed to react with 0.1 mole of pyrethric acid anhydride to yield N-(pyrethroxymethyl)-1-methyl-2-(2',4'-dimethylphenyl) maleimide, $n_D^{20}$ 1.5658, in 82% yield.

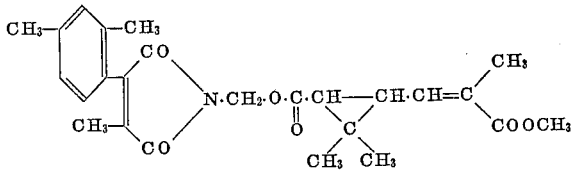

*Analysis.*—Found: C, 68.42; H, 6.66; N, 3.14%. Calculated (as $C_{25}H_{29}NO_6$): C, 68.32; H, 6.65; N, 3.19%.

Example 15

In similar way as described in Example 3, 0.1 mole of N-(chloromethyl)-1-methyl-2-(p-anisyl) maleimide was allowed to react with 0.1 mole of chrysanthemic acid to yield N-(chrysanthemoxymethyl)-1-methyl-2-(p - anisyl) maleimide, $n_D^{23}$ 1.5580, in 87% yield.

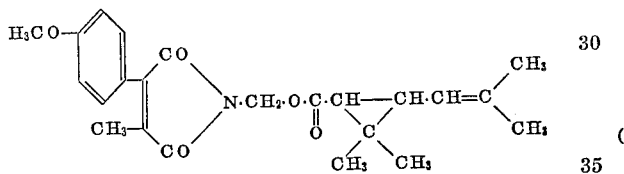

*Analysis.*—Found: C, 69.21; H, 6.87; N, 3.24%. Calculated (as $C_{23}H_{27}NO_5$): C, 69.50; H, 6.85; N, 3.52%.

Example 16

In similar way described in Example 1, 0.1 mole of N-(hydroxymethyl)-1-methyl-2 - (p - tolyl) maleimide was allowed to react with 0.1 mole of chrysanthemic acid anhydride to yield N-(chrysanthemoxymethyl)-1-methyl-2-(p-tolyl)maleimide, M.P. 82°–85° C., in 83% yield.

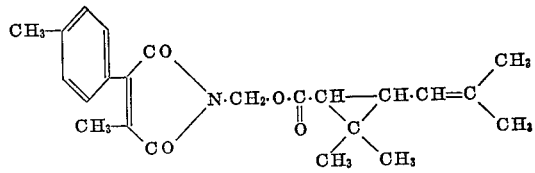

*Analysis.*—Found: C, 72.48; H, 7.11; N, 3.81%. Calculated (as $C_{23}H_{27}NO_4$): C, 72.42; H, 7.13; N, 3.67%.

As mentioned above, the present esters possess superior insecticidal power, and exhibit rapid knock down and excellent killing effect to house flies, mosquitoes, cockroaches, etc. Moreover, these esters are especially useful for sanitary and domestic purposes, because of their rapid effectiveness and harmlessness.

The present esters are suitably employed for the preparation of insecticidal compositions which have broad uses, correlatively with the low cost.

For the formulation of the insecticidal composition containing the present compound as the essential active ingredient, oil solution, emulsifiable concentrate, wettable powder, dust, aerosol, mosquito coil, bait and other preparations, may be formulated using the generally employed carriers, diluents or auxiliary agents, according to the method known to those skilled in the art in the cases of the formulation of pyrethrum extract and allethrin. If the compound is crystalline, it is preferably employed as a preliminarily prepared solution in an organic solvent, such as acetone, xylene, methylnaphthalene, etc., depending upon the type of the formulation.

If desired, the present esters may be employed for the preparation of the insecticidal compositions in combination with other insecticidal component, such as pyrethroide, for example, pyrethrum extract and allethrin, organochlorine and organophosphorus compounds, synergistic agent for pyrethroide, for example, piperonyl butoxide, piperonyl sulfoxide, $\beta$-butoxy-$\beta'$ - thiocyanodiethyl ether and the like. By combination with such other ingredient, the present insecticidal composition can be adapted to broader uses with more increased effect.

Concretely speaking, the present esters may be blended with at least one of pyrethrin, allethrin, O,O-dimethyl-O-(3-methyl-4-nitrophenyl) thiophosphate, malathion, diazinone, dimethoate, $\gamma$-BHC, and others, to yield a pesticidal composition which possesses high insecticidal activity wth rapid effectivity. In such cases, the both components may be blended in a broad range of proportions, for example, in ratio of 0.05:1 to 1:0.05 by weight of the ester to another insecticidal component.

The present esters are comparatively stable. However, if the present esters are intended to be stored under a severe condition for a long period of time, they may preferably be added with a small amount of a stabilizer, for example, alkylphenol compounds such as those having the formula

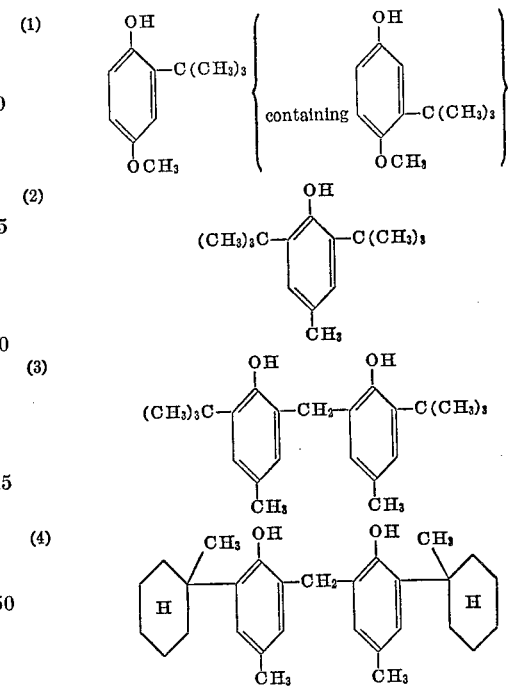

The amount of the stabilizer, if added, may be less than 1% by weight of the present ester, ordinarily from 1 to 0.1%.

The following are the illustrations of the insecticidal compositions containing the cyclopropanecarboxylic acid esters according to the invention and of the insecticidal activities.

Example 17

A solution of 2 g. of N-(chrysanthemoxymethyl)-methylmaleimide in 10 g. of xylene was diluted with a refined kerosene to make the volume 100 ml. whereby 2% oil preparation was obtained.

Ten milliliters of the resulting 2% oil preparation was sprayed onto house files (adult) in a settling-tower (McCallan, S.E.A., Wellman, R.H., Contributions of Boyce Thomson, Insta., vol. 12, p. 451, 1942) within 10 seconds. After 10 seconds, the shutter was opened and the house flies were exposed to the sprayed mist for 10 minutes and then taken out from the settling tower. The house flies were kept at a constant temperature and the mortality was examined after 20 hours. The mortality was higher than 90%.

Example 18

A solution of 0.2 g. of N-(chrysanthemoxymethyl)-dimethylmaleimide in 0.5 g. of xylene was diluted with a refined kerosene to make the volume 100 ml., whereby 0.2% oil preparation was obtained.

In a glass box of 70 cm. cube, about 30 house flies (adult) were liberated, and 0.3 ml. of the thus prepared 0.2% oil preparation was uniformly sprayed with an atomizer into the box. Knock-down number of house flies according to the laps of time were observed. Similarly, a 0.3% oil preparation containing allethrin was tested for comparison.

KNOCK-DOWN RATIO OF HOUSE FLIES ACCORDING TO THE LAPSE OF TIME
[Percent]

|  | 30 sec. | 1 min. | 2 min. | 4 min. | 8 min. | 11½ min. |
|---|---|---|---|---|---|---|
| The present compound (0.2%) | 4.8 | 29.7 | 59.7 | 74.0 | 86.3 | 90.4 |
| Allethrin (0.3%) | 3.3 | 16.1 | 55.4 | 73.4 | 82.2 | 92.3 |

Example 19

One gram of N-(chrysanthemoxymethyl)-methyl ethylmaleimide was diluted with a refined kerosene to make the volume 100 ml., whereby 1% oil preparation was obtained.

By metal turn-table method (Campbell, F. L., Sullivan, W. N., Soap and Sanit. Chemicals, vol. 14, No. 6, p. 119, 1938), each 5 ml. of the 1% oil preparation or that diluted with a refined kerosene was sprayed to about 100 house flies (adult) within 10 seconds. After 20 seconds, the shutter was opened and the house flies were allowed to expose to the sprayed mist for 10 minutes. Then, the house flies were transferred to a cage. The house flies were kept at a constant temperature, and the mortality was examined after 24 hours.

Concentration of
the ingredient, percent:     Mortality, percent
1.0 _____ 98.2
0.5 _____ 70.5
0.25 _____ 44.3

Example 20

Zero point four gram of N-(chrysanthemoxymethyl)-diethylmaleimide was diluted with refined kerosene to make the volume 100 ml., whereby 0.4% oil preparation was obtained. The resulting 0.4% oil preparation was tested in similar way as described in Example 18.

KNOCK-DOWN RATIO OF HOUSE FLIES ACCORDING TO THE LAPSE OF TIME
[Percent]

|  | 30 sec. | 1 min. | 2 min. | 4 min. | 8 min. | 11½ min. |
|---|---|---|---|---|---|---|
| The present compound (0.4%) | 4.8 | 20.9 | 64.9 | 76.3 | 82.6 | 88.1 |
| Allethrin oil preparation (0.3%) | 3.2 | 17.4 | 47.9 | 71.0 | 84.2 | 92. |

Example 21

In similar way as described in Example 19, 100 ml. of refined kerosene solution containing 0.6 g. of N-(chrysanthemoxymethyl)-methyl n-propylmaleimide was prepared and tested.

Concentration of
the ingredient, percent:     Mortality, percent
0.6 _____ 83.7
0.3 _____ 70.6
0.15 _____ 38.4

Example 22

An emulsifiable concentrate was obtained by uniformly mixing 10 g. of N-(chrysanthemoxymethyl)-methyl isopropylmaleimide, 80 g. of xylene and 10 g. of Sorpol SM-200 (a surface active agent, trade name of Toho Chemical Co., Ltd.).

The resulting 10% emulsifiable concentrate was diluted with 10 times by weight of water and tested in similar way as described in Example 17, excepting that the shutter was opened after 5 seconds instead of 10 seconds from the spraying. The mortality was higher than 90%.

Example 23

A solution of 0.75 g. of N-(chrysanthemoxymethyl)-dimethylmaleimide in 30 ml. of acetone was uniformly mixed with 99.25 g. of a mosquito coil carrier (a blend of tabu powder and pyrethrum marc in 2:3 proportion by weight). After evaporation of acetone, the mixture was kneaded with 180 ml. of water. The kneaded product was molded and dried to yield a mosquito coil containing 0.75% ingredient.

In a glass box of 70 cm. cube, about 30 common mosquitos (adult) were liberated. One gram piece of the 0.75% mosquito coil was held horizontally at the center of the bottom of the box and lit at the both ends. Knock-down ratio of the mosquito according to the lapse of time was observed.

Similarly a 0.75% mosquito coil containing allethrin was prepared and tested for comparison.

KNOCK-DOWN RATIO OF COMMON MOSQUITO ACCORDING TO THE LAPS OF TIME
[Percent]

|  | 3 min. | 6 min. | 12 min. | 24 min. | 48 min. |
|---|---|---|---|---|---|
| The present compound (0.75%) | 3.9 | 12.3 | 50.6 | 88.8 | 99.3 |
| Allethrin (0.75%) | 2.0 | 6.6 | 45.3 | 84.5 | 92.6 |

Example 24

In similar way as described in Example 23, a mosquito coil containing 1.5% by weight of N-(chrysanthemoxymethyl)-ethylmaleimide was prepared and tested, excepting that 2 g. piece of mosquito coil instead of 1 g. piece, and house flies instead of common mosquitos were used. Similarly a 0.75% mosquito coil containing allethrin was prepared and tested for comparison.

KNOCK-DOWN RATIO OF HOUSE FLIES ACCORDING TO THE LAPSE OF TIME
[Percent]

|  | 6 min. | 12 min. | 24 min. | 48 min. | 78 min. |
|---|---|---|---|---|---|
| The present compound (1.5%) | 2.0 | 8.2 | 50.4 | 82.8 | 84.7 |
| Allethrin (0.75%) | 0 | 3.4 | 31.6 | 70.4 | 81.3 |

Example 25

In similar way as described in Example 19, the oil preparations of N-(pyrethroxymethyl)-dimethylmaleimide, N-(pyrethroxymethyl)-methyl ethylmaleimide, N-(pyrethroxy-methyl)-methyl n-propylmaleimide and N-(pyrethroxymethyl)-diethylmaleimide were tested.

| Compound | Concentration of the ingredient | Knock-down ratio of house flies after 10 minutes | Mortality of house flies after 24 hours |
|---|---|---|---|
| N-(pyrethroxymethyl)-dimethylamaleimide | 0.25 | 100 | 84.3 |
| N-(pyrethroxymethyl)-methyl ethylmaleimide | 0.5 | 100 | 98.8 |
| N-(pyrethroxymethyl)-methyl n-propylmaleimide | 1.0 | 100 | 80.3 |
| N-(pyrethroxymethyl)-diethylmaleimide | 0.5 | 100 | 92.7 |

Example 26

In similar way as described in Example 18, 100 ml. of refined kerosene solution containing 0.18 g. of N-(pyrethroxymethyl) - dimethylmaleimide was prepared and tested.

KNOCK-DOWN RATIO OF HOUSE FLIES ACCORDING TO THE LAPSE OF TIME
[Percent]

|  | 30 sec. | 1 min. | 2 min. | 4 min. | 8 min. |
|---|---|---|---|---|---|
| The present compound (0.18%) | 11.8 | 46.8 | 69.0 | 85.5 | 89.3 |
| Allethrin oil preparation (0.4%) | 7.2 | 23.3 | 49.7 | 70.9 | 83.6 |

Example 27

A solution of 1 g. of N-(pyrethroxymethyl)-methyl ethylmaleimide in 5 g. of acetone was well mixed with 99 g. of 200 mesh talc in a mortar, and the acetone was evaporated from the mixture to leave 1% dust preparation.

About 50 house flies (adult) were put in a deep dish covered with a wire netting, which was then set at the bottom of the settling tower. One gram of the resulting dust preparation was sprayed upwardly at a pressure of 20 lbs./inch$^2$.

After 10 seconds, the shutter was opened and the house flies were exposed to the falling sprayed powder for 10 minutes and then taken out from the tower. The house flies were kept at a constant temperature of 27° C. and the mortality was examined after 24 hours. The mortality was higher than 90%.

Example 28

An emulsifiable concentrate was obtained by uniformly mixing 10 g. of N-(pyrethroxymethyl)-diethylmaleimide, 80 g. of xylene and 10 g. of Sorpol SM–200 (a surface active agent, trade name of Toho Chemical Co., Ltd.).

The resulting 10% emulsifiable concentrate was diluted with water and tested in similar way as described in Example 17 excepting that the shutter was opened after 5 seconds instead of 10 seconds from the spraying.

Concentration of the
ingredient, percent:      Mortality, percent
2.0 ------------------------------------- 95.4
1.0 ------------------------------------- 85.1
0.5 ------------------------------------- 16.0

Example 29

In similar way as described in Example 27, 3% dust preparation containing N-(pyrethroxymethyl)-phenyl-maleimide was prepared and tested, excepting that the mortality was examined after 20 hours instead of 24 hours. The mortality was 90%.

Example 30

Zero point four gram of N-(chrysanthemoxymethyl)-1-methyl-2-phenylmaleimide was diluted with kerosene to make the volume 100 ml., whereby 0.4% oil preparation was obtained. The resulting 0.4% oil preparation was tested in similar way as described in Example 18.

KNOCK-DOWN RATIO OF HOUSE FLIES ACCORDING TO THE LAPSE OF TIME
[Percent]

|  | 30 | 1 | 2 | 4 | 8 | 11½ |
|---|---|---|---|---|---|---|
| The present compound (0.4%) | 1.3 | 8.0 | 18.8 | 65.5 | 85.6 | 89.5 |
| Allethrin oil preparation (0.3%) | 1.7 | 5.8 | 34.1 | 72.2 | 86.0 | 92.7 |

EXAMPLE 31

A solution of 1 g. of N-(chrysanthemoxymethyl)-1-ethyl-2-phenylmaleimide in 10 g. of xylene was diluted with a refined kerosene to make the volume 100 ml. whereby 1% oil preparation was obtained.

The resulting 1% oil preparation was tested in similar way as described in Example 19, excepting that 50 house flies/group was employed instead of 100 house flies.

Knock down ratio of house flies:      Percent
After 10 minutes ----------------------- 100
After 24 hours ------------------------- 94

EXAMPLE 32

A solution of 1 g. of N-(pyrethroxymethyl)-1-methyl-2-(2',4'-dimethylphenyl)-maleimide in 5 g. of xylene was diluted with kerosene to make the volume 100 ml. whereby 1% oil preparation was obtained.

The resulting 1% oil preparation was tested in similar way as described in Example 27, excepting that 5 ml. of the oil preparation was used instead of 1 g. of the dust preparation, and the mortality was examined after 20 hours instead of 24 hours. The mortality was 97%.

EXAMPLE 33

An emulsifiable concentrate was obtained by uniformly mixing 20 g. of N-(chrysanthemoxymethyl)-1-methyl-2-(p-anisil) maleimide, 70 g. of xylene and 10 g. of Sorpol SM–200 (a surface active agent, trade name of Toho Chemical Co., Ltd.).

The resulting 20% emulsifiable concentrate was diluted with 10 times by weight of water and tested in similar way as described in Example 17, by spraying upwardly at a pressure of 20 lbs./inch$^2$ and using 50 house flies/group. The mortality was 95%.

EXAMPLE 34

A solution of 0.5 g. of N-(chrysanthemoxymethyl)-1-methyl-2-(p-tolyl) maleimide in 1.5 g. of xylene was diluted with refined kerosene to make the volume 100 ml. whereby 0.5% oil preparation was obtained.

In similar way as described in Example 19, the resulting 0.5% oil preparation was tested excepting that 50 house flies/group was used instead of 100 house flies. The mortality was 96%.

What we claim is:

1. A cyclopropanecarboxylic acid ester having the formula,

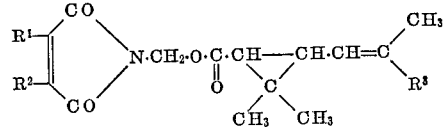

wherein $R^1$ is hydrogen, methyl, ethyl, propyl, isopropyl

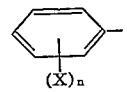

wherein X is methyl or methoxy and $n$ is 0 to 2; $R^2$ is hydrogen, methyl, ethyl, propyl or isopropyl; and $R^3$ is methyl or methoxycarbonyl.

2. An ester according to claim 1, wherein $R^3$ is methyl.
3. An ester according to claim 1, wherein $R^3$ is methoxycarbonyl.
4. A compound selected from the group consisting of N-(chrysanthemoxymethyl)-methyl-maleimide,
N-(chrysanthemoxymethyl)-dimethylmaleimide,
N-(chrysanthemoxymethyl)-methylethylmaleimide,
N-(chrysanthemoxymethyl)-diethylmaleimide,
N-(chrysanthemoxymethyl)-methyl n-propylmaleimide,
N-(chrysanthemoxymethyl)-methyl isopropylmaleimide,
N-(pyrethroxymethyl)-dimethylmaleimide,
N-(pyrethroxymethyl)-methyl ethylmaleimide,
N-(pyrethroxymethyl)-methyl n-propylmaleimide,
N-(pyrethroxymethyl)-diethylmaleimide,
N-(pyrethroxymethyl)-phenylmaleimide,
N-(chrysanthemoxymethyl)-1-methyl-2-phenylmaleimide,
N-(chrysanthemoxymethyl)-1-ethyl-2-phenylmaleimide,
N-(pyrethroxymethyl)-1-methyl-2-(2',4'-dimethylphenyl) maleimide,
N-(chrysanthemoxymethyl)-1-methyl-2-(p-anisil) maleimide and
N-(chrysanthemoxymethyl)-1-methyl-2-(p-tolyl) maleimide.

13

5. A compound according to claim 4 wherein said compound is N-(chrysanthemoxymethyl)-dimethylmaleimide.
6. A compound according to claim 4, wherein said compound is N-(chrysanthemoxymethyl)-methylethylmaleimide.
7. A compound according to claim 4, wherein said compound is N-(chrysanthemoxymethyl)-methyl n-propylmaleimide.
8. A compound according to claim 4, wherein said compound is N-(pyrethroxymethyl)-dimethylmaleimide.
9. A compound according to claim 4, wherein said compound is N-(chrysanthemoxymethyl)-1-methyl-2-phenylmaleimide.

14

References Cited

UNITED STATES PATENTS

| 1,915,334 | 6/1933 | Salzberg et al. | 260—243 |
| 2,075,359 | 3/1937 | Salzberg et al. | 167—22 |

ALEX MAZEL, *Primary Examiner.*

JOSE TOVAR, *Assistant Examiner.*

U.S. Cl. X.R.

167—33; 424—274